March 11, 1947.   J. H. BOOTH   2,417,073
VARIABLE RATIO STEERING ASSEMBLY
Filed April 18, 1945   3 Sheets-Sheet 1
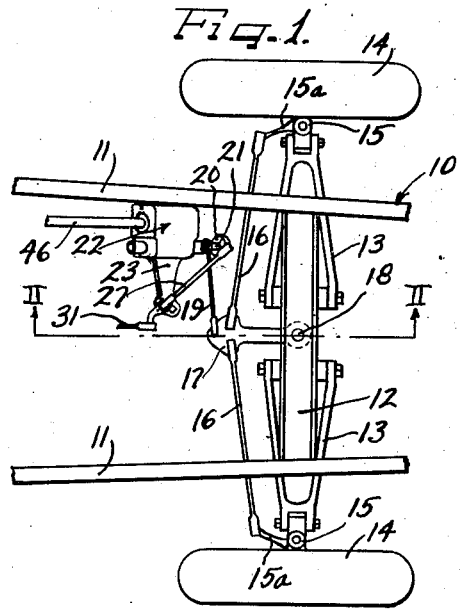
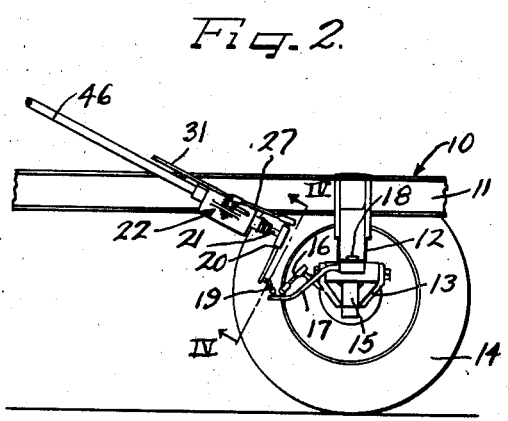
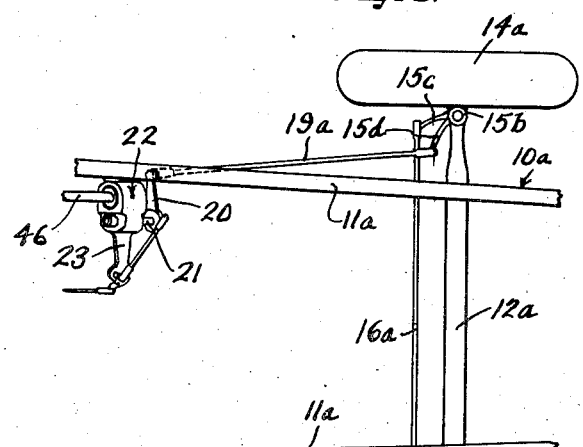
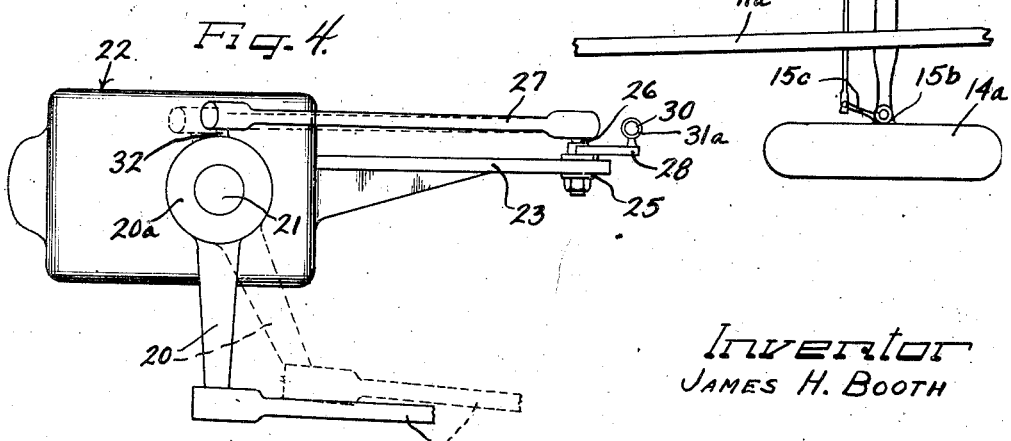
Inventor
JAMES H. BOOTH

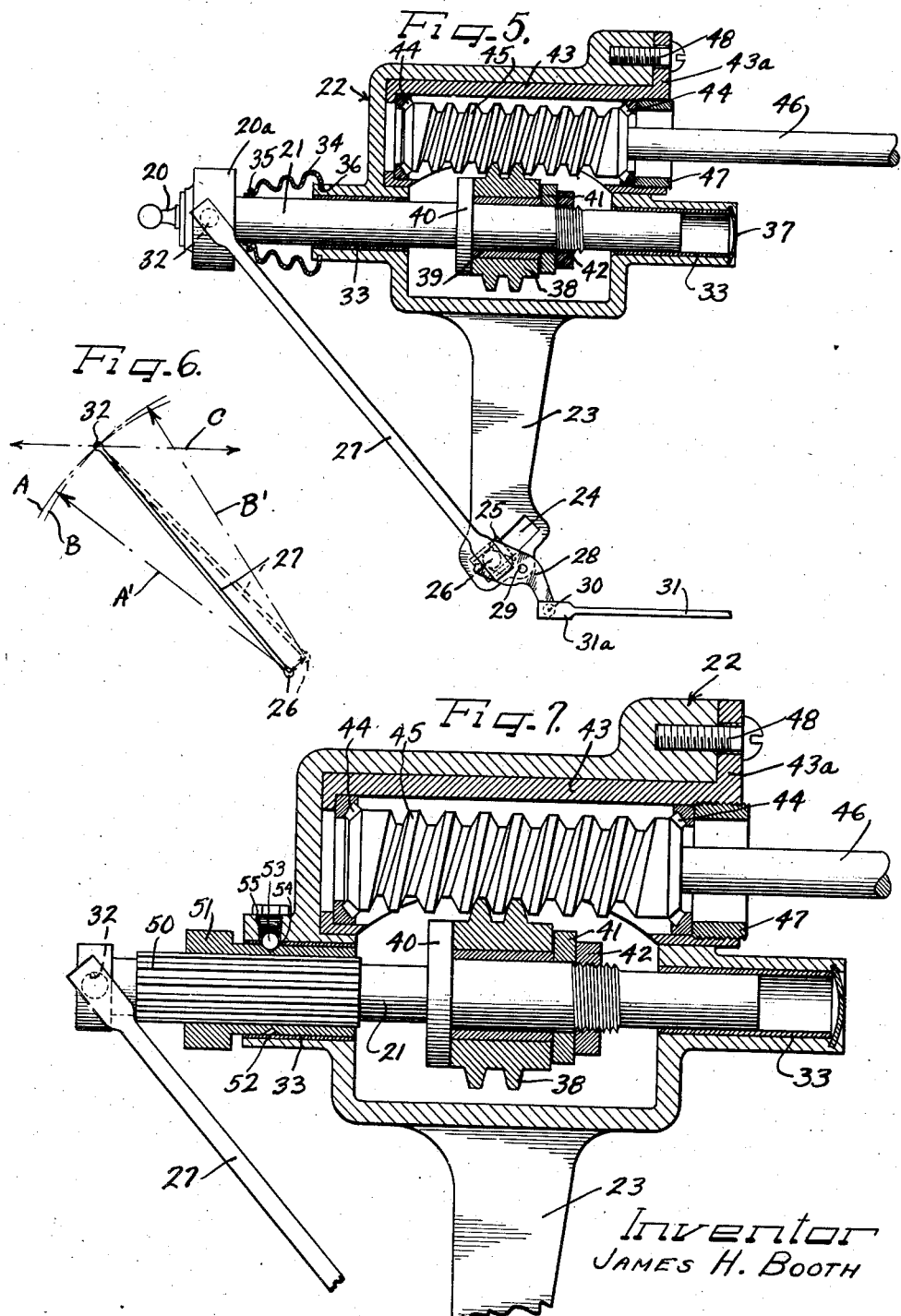

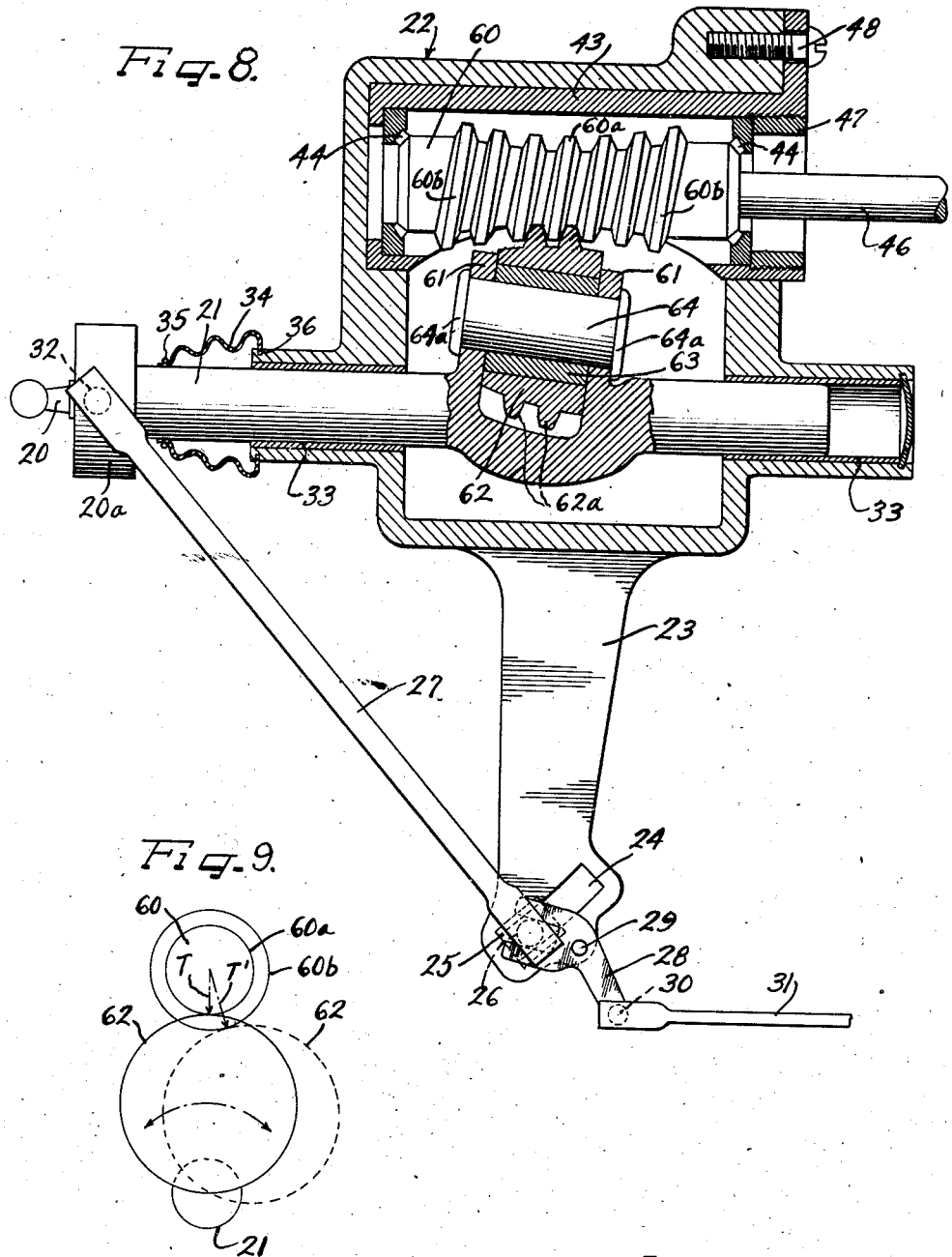

Patented Mar. 11, 1947

2,417,073

UNITED STATES PATENT OFFICE 2,417,073

VARIABLE RATIO STEERING ASSEMBLY

James H. Booth, Detroit, Mich., assignor to Thompson Products, Inc., Cleveland, Ohio, a corporation of Ohio Application April 18, 1945, Serial No. 589,039

14 Claims. (Cl. 74—496)

This invention relates to steering mechanisms wherein the driving reduction ratio between the steering wheel or part and the dirigible part can be varied at will by the operator without replacement of parts.

Specifically this invention relates to a steering assembly for automotive vehicles wherein a steering shaft drives a worm that is meshed with a follower carried by a slidable pitman arm shaft and wherein the degree of swinging of the pitman arm on this slidable shaft is selectively controlled by a manually shiftable link.

This invention provides a simple and relatively inexpensive device whereby an easily manipulated control rod will change the steering ratio in a steering assembly, thereby enabling the driver of a vehicle or the like to decrease or increase the steering reduction ratio of the vehicle as different steering conditions are encountered. The devices of this invention are adjusted at the will of the operator without stopping the vehicle. Thus, when an automobile or other vehicle is being driven along a smooth paved road, the operator may desire a relatively low reduction in the steering assembly so that small turning movements of the steering wheel will effect relatively large turning movements of the dirigible wheels. However, when the automobile leaves the paved road and is driven over a gravel or mud road wherein turning of the wheels is more difficult, the driver can merely shift the control rod of the device of this invention to obtain a much greater driving reduction in the steering assembly thereby giving him an increased mechanical advantage in turning the dirigible wheels. The devices of this invention are especially useful in parking an automobile since a comfortable driving reduction for driving purposes can be materially increased for turning the dirigible wheels when the car is being manipulated into or out of a small parking space.

According to this invention, a gear box is provided with an eccentric cage which rotatably carries a worm. A worm follower is rotatably mounted on a pitman arm shaft that is slidably carried by the gear box. The gear box has a laterally extending arm pivotally supporting a shiftable yoke member or the like which actuates a block slidable in an arcuate recess of the arm. A link is pivoted at one end to the block and at the other end to the pitman arm. Alternately, this other end of the link can be pivoted to another member on the slidable pitman arm shaft. The arcuate recess is struck from a radius centered on the neutral or straight-ahead position of the pivot for the other end of the link.

The worm drives the follower to shift the pitman arm shaft so that it projects from the gear box in variable length increments. A pitman arm is either directly secured to or splined on the pitman arm shaft. Swinging movement of the pitman arm shifts a drag link to actuate steering mechanism for turning the dirigible wheels. This swinging movement is controlled by the link, and shifting of the block by the yoke member will shift the axis of the link to vary the amount of rotation of the pitman arm shaft in proportion to the amount of lengthwise shifting of the shaft by the worm wheel.

Thus, if the pitman arm shaft is shifted a distance of one inch, the amount of rotation for the shaft in this one inch shift can be controlled by varying the center point for the control link that is pivoted to the shaft or pitman arm on the shaft. The shifting of the center point for the control rod is accomplished by the operator or driver through manual manipulation of a control rod that can be extended to the dash of an automobile or other vehicle.

In one modified embodiment of the invention, an hour-glass-shaped worm is used in combination with a follower that is eccentrically mounted on the shiftable pitman arm shaft. The arrangement is such that the follower always tends to return to the smallest diameter portion of the worm, thereby causing the steering assembly to maintain a straight-ahead position.

An object of the invention is to provide a device for readily changing the steering ratio of a steering assembly.

A specific object of the invention is to provide a device for longitudinally shifting a pitman arm shaft and for swinging the pitman arm thereon in variable degrees relative to the amounts of shifting of the shaft.

Another object of the invention is to provide a steering assembly for automotive vehicles that can be easily set by the driver of the vehicle to have the most comfortable amount of driving reduction.

A specific object of this invention is to provide a gear box arrangement wherein relative rotary movement between driving and driven geared-together parts is varied by shifting the center of a link.

A further specific object of this invention is to provide a variable ratio steering assembly for automotive vehicles which is readily adapted for use with either solid axle mounted wheels or independently suspended wheels.

A still further specific object of the invention is to provide a steering gear box with a worm increasing in diameter from the center toward the ends, and a swingable worm follower that meshes therewith to automatically increase the leverage in favor of the pitman arm as the follower moves to the large diameter end portions of the worm, thereby increasing the tendency for reversing the steering operations as the follower reaches the ends of the worm.

Other and further objects of the invention will be apparent to those skilled in the art from the following detailed description of the annexed sheets of drawings which, by way of preferred examples, illustrate three embodiments of the invention.

On the drawings:

Figure 1 is a fragmentary top plan view of an automotive vehicle chassis equipped with independently suspended dirigible wheels and a steering assembly in accordance with this invention.

Figure 2 is a vertical cross-sectional view taken substantially along the line II—II of Figure 1 with parts in elevation.

Figure 3 is a view similar to Figure 1 but illustrating an automotive vehicle chassis with solid axle mounted wheels and equipped with a steering assembly in accordance with this invention.

Figure 4 is an enlarged front end elevational view of the gear box of the steering assembly according to this invention corresponding with a view taken along the line IV—IV of Figure 2, but illustrating the gear box in reversed arrangement for use with a vehicle having a steering shaft on the right side thereof.

Figure 5 is a top plan view, with parts broken away and shown in horizontal cross section, of the device shown in Figure 4.

Figure 6 is a diagram illustrating the effects of shifting the pivot for the link in the device of Figures 4 and 5.

Figure 7 is a view similar to Figure 5 but illustrating a modification wherein the pitman arm is splined onto the shiftable shaft and held against longitudinal movement.

Figure 8 is a view similar to Figure 5 but illustrating a further modification wherein a driving worm is equipped with teeth of varying diameter and wherein the driven worm follower is swingably mounted to mesh with the worm teeth for automatically changing the lever advantage of the assembly as the follower is moved toward the ends of the worm.

Figure 9 is a diagram illustrating the operation of the device of Figure 8.

As shown on the drawings:

In Figures 1 and 2 the reference numeral 10 designates generally the chassis of an automotive vehicle. The chassis 10 has side frame beams 11, 11 and a cross beam 12 pivotally supporting links or sub-axles 13, 13. Wheels 14, 14 are rotatably mounted on spindles 15, 15 pivotally carried by the sub axles 13, 13. Steering arms 15a are provided on the spindles and these arms are connected through tie rods 16, 16 with a center steering arm 17 that is pivoted to the cross beam 12 as at 18.

A drag link 19 is also connected to the center steering arm 17. The tie rods 16 and drag link 19 have ball and socket joint connections with the center steering arm so that the wheels 14 can rise and fall independently of each other and relative to the cross beam 12.

The drag link 19 is connected to a pitman arm 20. This pitman arm 20 is carried by a pitman arm shaft 21 projecting from a gear box 22 which is secured to a side frame beam 11.

In the solid axle steering arrangement according to this invention the chassis 10a has side frame beams 11a, 11a and a solid front axle 12a carried thereby as shown in Figure 3. The spindle assemblies 15b are swingably suspended on the ends of the axles 12a and carry wheels 14a. The steering arms 15c of the spindle assemblies are connected together by a single tie rod 16a. A second steering arm 15d on one of the spindle assemblies 15b is connected through a drag link 19a with the pitman arm 20 on the shaft 21 of the same type of gear box 22 described in Figures 1 and 2. The pitman arm 20 is rotated 90° from the depending operative position shown in Figures 1 and 2 to the laterally extending position shown in Figure 3. Rotation of the pitman arm shaft 21 causes the pitman arm 20 to swing for actuating the drag links 19 or 19a to steer the wheels 14 or 14a.

The gear box 22 as best shown in Figures 4 and 5 has a laterally extending arm 23 with an arcuate slot 24 therethrough at the end thereof. A block 25 is slidably mounted in the slot 24. This block 25 has a ball stud 26 on the top thereof receiving the end of a link 27 thereon in universal relation. A yoke member 28 is pivoted to the end of the arm as at 29 and has yoke arms straddling the stud 26. The other end of the yoke member 28 has a ball stud 30 thereon seated in the socket end 31a of a link rod 31. This link rod 31 can extend through the dash of the automotive vehicle 10 or 10a to be readily accessible to the operator so that pulling the rod will cause a shifting of the yoke member 28 about the pivot 29 thereby moving the block 25 in the recess 24 to change the position of the ball stud 26 and thus shifting the center for the link 27. The link 27 is connected at its other end to a ball stud 32 on the boss end 20a of the pitman arm 20. This boss end 20a of the pitman arm receives the shaft 21 therein.

As best shown in Figure 5, the shaft 21 is slidably mounted in tubular bearings 33 carried by the gear box 22. The shaft projects from the front end of the box and a flexible boot 34 is connected at one end to the shaft 21 by means of a ring 35 and is seated in a groove 36 of the box 22 at the other end to protect the projecting portion of the shaft 21 from dirt, and to retain lubricant on the gearing 33. The other bearing 33 is protected from dirt by a cap 37 secured to the box 22.

A worm follower 38 is rotatably mounted around the shaft 31 in the box 22. A bearing 39 is provided for the follower. The shaft 21 has a collar 40 thereon abutting one end face of the bearing 39 and a washer 41 is disposed around the shaft abutting the other face of the bearing. A nut 42 is threaded on a portion of the shaft against the washer 41. The follower 38 is thus held against longitudinal movement relative to the shaft 21 but it is free to rotate relative to the shaft.

An eccentric cage 43 is adjustably mounted in the gear box 22. This cage 43 carries bearings 44 which rotatably support a worm 45 on a steering shaft 46. A collar 47 is threaded in the cage 43 to thrust against one of the bearings 44 for holding the worm in the cage. The cage 43 has an end flange 43a thereon with a slot therethrough receiving a screw 48 which is threaded into the gear box 22. Rotation of the cage 43 will shift the worm 45 toward and away from the follower 38 since the cage is eccentric. The cage is locked in adjusted position in the gear box 22 by the screw 48.

Rotation of the steering shaft 46 will drive the worm 45 to rotate the follower 38. This follower, in turn, will thrust against the collar 40 or washer 41 to longitudinally shift the shaft 21 in the bearings 33. The link 27 is rigid and, while the ball studs 26 and 32 receiving the ends of the link permit pivotal movement of the link, a selected fixed position for the ball stud 26 will hold the ball stud 32 for movement in a fixed arc as the shaft 21 is moved longitudinally in the bearings 33. Longitudinal movement of the shaft 21 is thereby resolved into rotating movement for swinging the pitman arm 20.

As shown in the diagram of Figure 6, the ball stud 32 moves along arcs A or B having radii A' or B' depending upon the position of the ball stud 26. Thus, when the ball stud 26 is at one end of the slot 24, as shown in solid lines in Figure 6, the radius A' will be swung from the solid line center point and an arc A will be struck. However, when the ball stud 26 is shifted to the other end of the slot 24, as shown in dotted lines, the radius B' struck from this center point will form an arc B. The movement of the shaft carrying the stud 32 along the path C will thus cause rotation of the pitman arm on the shaft in an amount determined by the setting for the ball stud 26. For example, when the ball stud is set as shown in the solid line position, the pitman arm will be rotated less per increment of longitudinal movement of the shaft 21 than when the ball stud 26 is shifted to the dotted line position because the arc A is inclined less relative to the path C than the arc B.

From the above descriptions it should be understood that the driver of the vehicle 10 or 10a, by manipulation of the rod 31, can so shift the center for the link 27 to vary the amount of rotation of the pitman arm 20 relative to the actuating steering shaft 46. Thus, if the driving reduction between the shaft 46 and the pitman arm 20 is not great enough for comfortable driving as, for example, when parking the vehicle, the operator need only shift the rod 31 to increase this reduction and thereby obtain a greater mechanical advantage in the steering linkage. Swinging of the pitman arm 20 in the embodiment shown in Figures 1 and 2 moves the end of the arm in a transverse path between the frame beams 11, 11. This causes the drag link 19 to shift the arm 17 about the pivot 18 and the tie rods 16, 16 thereby effect movement of the steering arms 15a to swing the dirigible wheels 14, 14. In the embodiment shown in Figure 3, the laterally extending pitman arm 20 is swung about an inclined shaft 21 and thereby has a fore and aft component of movement to push and pull the drag link 19a for swinging the steering arm 15d toward and away from the axle 12a. The tie rod 16a connects the steering arms 15c and both dirigible wheels 14a, 14a are turned.

In the embodiment shown in Figure 7, parts identical with parts described in Figures 4 and 5 have been marked with the same reference numerals. In Figure 7, the pitman arm shaft 21 has a splined portion 50 receiving a splined boss 51 in keyed relation thereon. This boss 51 is rotatable in the bearing sleeve 33 for the shaft 21. A groove 52 is provided around the boss 51 and a ball 53 is seated in this groove. The ball 53 is disposed in a bore 54 provided in the casing 22 and a plug 55 threaded into the bore 54 abuts the ball to hold it in the groove 52. The shaft 21 can thus slide through the boss 51 and the ball 53 holds the boss against sliding with the shaft. However, since the boss and shaft are splined together, any rotation of the shaft is applied to the boss. The boss 51 has the pitman arm depending therefrom.

The end of the shaft 21 has the ball stud 32 thereon and the link 27 receives the ball stud.

Thus, in the modification of Figure 7, the pitman arm will not shift with the shaft 21 as in the modification shown in Figures 4 and 5, but the pitman arm will rotate in amounts determined by the setting of the center for the link 27. This modification is desired where the steering linkage requires a fixed swinging pivot for the pitman arm.

In the embodiment shown in Figure 8, parts identical with parts described in connection with Figures 4 and 5 have also been marked with the same reference numerals. In Figure 8 the steering shaft 46 has an hourglass-shaped worm 60 thereon. Thus the teeth of the worm increase in diameter from the central portion toward the ends of the worm with the center tooth 60a being the smallest tooth and with the end teeth 60b being the largest teeth. The teeth between the center teeth 60a and the end teeth 60b increase gradually from the diameter of the tooth 60a to the diameter of the teeth 60b.

The pitman arm shaft 21 has a yoke portion providing opposed yoke arms 61 receiving the worm follower 62 therebetween. The gear 62 is mounted on a bearing 63 and an inclined pin 64 carries the bearing and is passed through the arms 61. Heads 64a are provided on the ends of the pin to hold it in position. The shaft 64 is inclined so that the teeth 62a on the follower 62 will be parallel to the worm tooth which they straddle. This provides for an increased meshing contact between the teeth.

Rotation of the worm 60 will shift the worm follower 62 to slide the shaft 21 in its bearings 33. However, since the link 27 will also cause the shaft 21 to rotate, the follower 62 will swing as illustrated in Figure 9 about the shaft axis 21. This swinging of the gear 62 permits the teeth thereon to successively mesh with the small teeth 60a and the large teeth 60b of the worm 60. The torque arm T between the driving worm 60 and the small teeth 60a is thus increased to a longer torque arm T'. The longer torque arm T' increases the mechanical advantage in favor of the pitman arm 20 and causes the assembly to be more reversible since the follower 62 will tend to move toward the small teeth 60a. By setting the pitman arm 20 on the shaft 21 so that the dirigible wheels are in straight-ahead position when the follower 62 engages the smaller teeth 60a of the worm, there is always a tendency for the follower to work toward the center of the worm thereby creating a quick recovery from extreme steering positions.

The operation of the link 27 in the embodiment of Figure 8 is identical with the operation described in connection with Figures 4 and 5. The modification of Figure 8 is especially useful in imparting additional reversibility of steering, and in speeding up the extreme steering conditions.

All embodiments of this invention give the operator an easy control of the driving reduction in a steering assembly, making it possible to facilitate maneuvering of the dirigible wheels of the vehicle when the vehicle is being parked, and also giving a very comfortable reduction for driving on smooth roads at relatively high speeds.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a driving reduction linkage, a driving gear, a follower driven thereby, a slidable shaft supporting said follower, a link operatively connected to said shaft for rotating the shaft in response to sliding movements thereof, an anchor for said link, and means for shifting said link anchor to vary the degree of rotation of the shaft relative to the degree of sliding movement of the shaft.

2. A driving reduction assembly comprising a worm, a follower in meshed relation with said worm, a sliding shaft carrying said follower, a link operatively connected to said shaft for rotating the shaft as it slides, a pivot anchor for said link, and means for shifting the pivot anchor of the link to vary the amount of rotation of the shaft relative to the amount of sliding movement of the shaft.

3. A driving reduction assembly comprising a rotatable drive shaft, a worm on said drive shaft, a slidably mounted shaft, a follower freely rotatable on said slidably mounted shaft, means on said slidably mounted shaft holding said follower against relative sliding movement thereon, a link member operatively connected to said slidably mounted shaft, and a shiftable anchor for said link member, said link member being effective to resolve sliding movement of the slidable shaft into rotating movement in amounts determined by the setting of said shiftable anchor.

4. A driving reduction assembly comprising a gear box having a laterally projecting arm, a worm rotatably mounted in said gear box, a shaft slidably carried by said gear box, a follower freely rotatable on said shaft, means holding said follower against sliding movement on the shaft, a link anchored on said arm and operatively connected to said sliding shaft for resolving sliding movement thereof into rotating movement, and means for shifting said link on said arm to vary the rotating effect of the link on the slidable shaft.

5. A steering assembly comprising a steering shaft, a worm driven thereby, a sliding shaft, a worm follower meshed with said worm rotatably mounted on said sliding shaft, a pitman arm on said sliding shaft, a link operatively connected to said pitman arm for swinging the arm as the shaft slides, and means for selectively anchoring said link to vary the degree of swinging of the pitman arm relative to the sliding movement of the shaft.

6. A steering assembly comprising a steering shaft, a sliding shaft driven by said steering shaft, a link for resolving sliding movement of said sliding shaft into rotating movement, a pitman arm swung by said shaft, and means for shifting said link to vary the degree of swinging of the pitman arm relative to the amount of sliding of the shaft.

7. In an automotive steering assembly, a gear box adapted for attachment to an automobile chassis, an arm extending from said gear box, a shaft slidably carried by said gear box in angular relation to said arm, a wheel rotatably mounted on said shaft, a worm rotatably mounted in said gear box and meshed with said wheel, a steering shaft for driving said worm, said worm sliding said shaft to project from said gear box in varying amounts, a pitman arm on said shaft, a link connected to said pitman arm, an anchor for said link slidably mounted on said arm of the gear box, a member for shifting said anchor, and means for manually actuating said member, said link resolving sliding movement of the sliding shaft into swinging movement of the pitman arm in amounts determined by the setting of said anchor.

8. A steering assembly comprising a gear box, a slidable shaft projecting from said gear box, a pitman arm on said shaft, means for resolving sliding movement of said shaft into swinging movement for the pitman arm, and means for regulating said means to vary the degree of swinging of the pitman arm relative to the amount of movement of the shaft.

9. A steering assembly comprising a gear box, a worm rotatably mounted in said gear box having teeth which increase in diameter from the center toward the ends of the worm, a shaft slidably mounted in said gear box having arms projecting therefrom, an axle carried by said arms in inclined relation to said shaft, a follower rotatably mounted on said axle arranged to mesh with the teeth of said worm, and means for swinging said shaft as it rotates to continue the meshed engagement of the worm and follower for changing the torque arm relationship between the follower and worm as the follower approaches the ends of the worm to impart increased reversibility of steering to the assembly.

10. A steering assembly comprising a driving worm having teeth increasing in diameter from the center towards the end of the worm, a follower driven by said teeth, and means for swinging the follower to maintain engagement thereof with the worm whereby the mechanical advantage between the worm and follower is changed to impart reversibility of steering to the assembly.

11. A steering assembly comprising a gear box, a rotatably mounted worm therein, a slidable shaft carried by said gear box, a worm follower rotatable on said shaft, a pitman arm splined to said shaft, means holding said pitman arm against sliding movement with the shaft, a link member extending from said gear box to said shaft for rotating the shaft in response to sliding movement thereof to thereby swing the pitman arm, and means for shifting said link to vary the amount of swing relative to the amount of shifting of the shaft.

12. A selective mechanical movement assembly comprising a reciprocably mounted member, a pivotally anchored link operatively connected to said member for resolving reciprocating movement thereof into rotating movement, and means for shifting the pivot anchor of the link to vary the degree of said resolution of reciprocating movement of the member into rotative movement.

13. A selective mechanical movement assembly comprising a member, means mounting said member for reciprocating and rotating movement, a link, a universal joint connecting the link with said member, a pivot anchor for said like positioned to hold the universal joint for movement in an arcuate path at an angle to the path of reciprocating movement of the member for resolving reciprocating movement of the member into rotating movement along said arcuate path, and means for shifting the pivot anchor to change the angular relationship between the arcuate path and the path of reciprocal movement of the member for varying the degree of said resolution of movement of the member.

14. A steering assembly comprising a steering shaft, a member reciprocably driven by said shaft, a link connected to said member for universal movement relative thereto, a pivot anchor for said link positioned to swingably mount the link for effecting rotation of the member as it is reciprocated by said steering shaft, means for shifting the pivot anchor of said link to vary the degree of rotation of the member relative to the degree of reciprocation thereof by said steering shaft, and a pitman arm operatively connected to said member to rotate with the member.

JAMES H. BOOTH.

REFERENCES CITED

The following references are of record in the file of this patent:

UNITED STATES PATENTS

| Number | Name | Date |
| --- | --- | --- |
| 1,909,330 | Banker | May 16, 1933 |
| 957,474 | Parkes | May 10, 1910 |
| 914,020 | Coles | Mar. 2, 1909 |

FOREIGN PATENTS

| Number | Country | Date |
| --- | --- | --- |
| 480,054 | British | Feb. 16, 1938 |
| 789,745 | French | Aug. 26, 1935 |